April 2, 1957 — L. S. SIEBERT — 2,787,315
SPRING SEAT FOR OUTBOARD BOATS
Filed Feb. 5, 1954
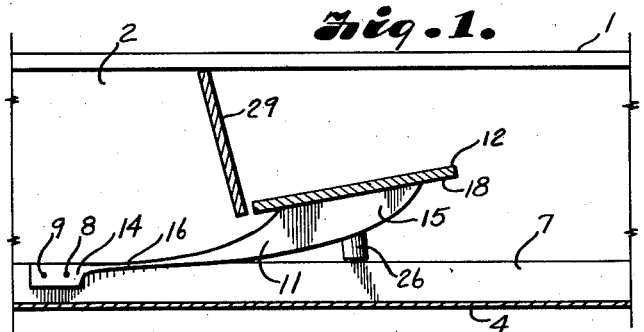
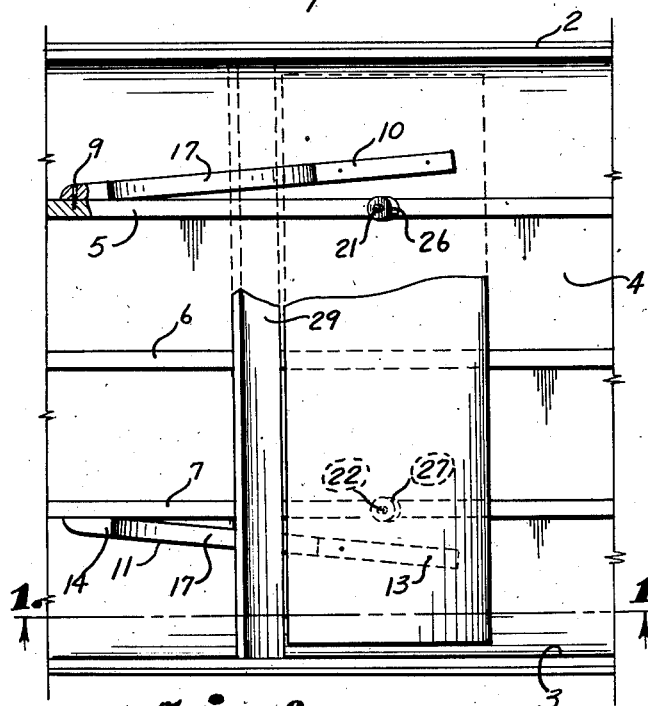
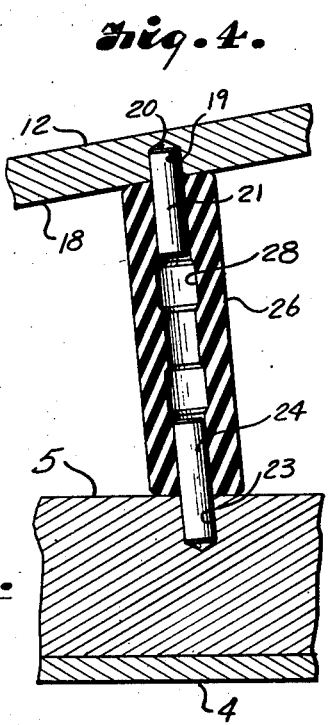
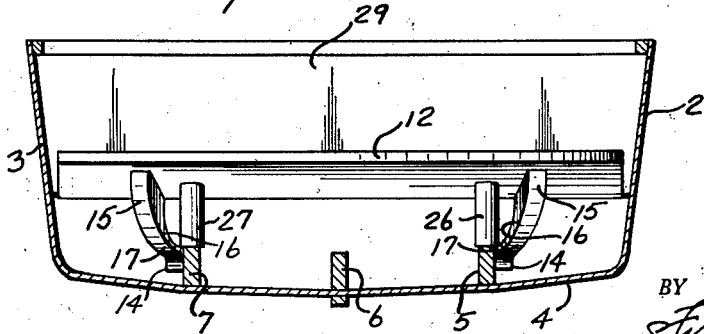
INVENTOR.
Lee S. Siebert.
BY
ATTORNEYS.

United States Patent Office 2,787,315
Patented Apr. 2, 1957

2,787,315

SPRING SEAT FOR OUTBOARD BOATS

Lee S. Siebert, Kansas City, Mo., assignor of one-half to R. A. McDerby, Denison, Tex.

Application February 5, 1954, Serial No. 408,325

6 Claims. (Cl. 155—51)

This invention relates to a resilient seat for boats and more particularly to such a seat for boats of outboard runabout type.

The principal objects of the present invention are to provide a resilient seat for boats or the like mounted on rubber tubular members or the like secured to the longitudinal frame members in the bottom of the boat; to provide pivotally mounted guide rails or unit arms; to provide means for securing said arms to the rails; to provide said arms with thin portions so as to provide resiliency thereto and thickened in width to prevent lateral sway of the seat mounted on the enlarged outer ends thereof for carrying the seat; and to provide a device of this character simple, economical to manufacture and efficient in operation.

In accomplishing these and other objects of the present invention, I have provided improved details of structure, the preferred form of which are illustrated in the accompanying drawings, wherein:

Fig. 1 is a cross-sectional view of the seat and mounting taken on line 1—1, Fig. 2, the boat being in fragmentary view.

Fig. 2 is a fragmentary plan view of the boat showing the device mounted thereon, particularly illustrating the seat guide units and longitudinal rails of the boat frame.

Fig. 3 is a transverse cross-sectional view through the boat, particularly illustrating the seat guide rails and rubber mounting.

Fig. 4 is an enlarged fragmentary view particularly illustrating the dowels and rubber mountings.

Referring more in detail to the drawings:

1 designates a boat to which my seat mounting is particularly adapted, having sides 2 and 3 and a bottom 4. Extending longitudinally of the bottom 4 is a plurality of rails 5, 6 and 7. Rigidly mounted by screws or the like 8 and 9 to the respective side rails 5 and 7 are guide units or seat supporting arms 10 and 11 and mounted on the free ends thereof is a seat member 12 by suitable means such as screws or the like as indicated at 13. The guide units or seat supporting arms have enlarged ends as indicated at 14 for securing them to the longitudinal rails of the boat and the free ends are also widened as indicated at 15 to provide seat attaching portions. The arms 10 and 11 are narrowed between the ends thereof and near the large ends 14 as indicated at 16. The arms 10 and 11 are also of a width laterally as indicated at 17 and are splayed apart as shown in Fig. 2 of the drawing to prevent lateral sway of the seat.

The underneath side 18 of the seat member 12 is provided with spaced recesses or sockets as indicated at 19 (Fig. 4) adapted to receive the ends 20 of dowel pins 21 and 22. The rails 5 and 7 are also provided with recesses or sockets 23 in alignment with the openings 19 in the seat member in which are adapted to engage dowel pins 24 (Fig. 4) and 25 (not shown). Rubber resilient members 26 and 27 are adapted to engage between the longitudinal rails 5 and 7 and the seat 12 and are tubular in that they each have a longitudinal opening 28 therethrough. The free ends of the dowel pins 21 and 22 and 24 and 25 engage in the ends of said tubular resilient members to keep said members in substantially vertical position and are spaced apart to maintain resiliency or spring in the midportions of the members 26 and 27 when weight is placed on the seat member. A bulkhead 29 of the boat provides a back for the seat as best illustrated in Fig. 1, the bulkhead being spaced from the bottom of the boat and having ends attached to the sides thereof so that the arms 10 and 11 extend thereunder as shown in Figs. 1 and 3 of the drawings.

With the device assembled as described when weight of a person is exerted on the seat 12, the natural spring of the guide units 10 and 11 provide some resiliency in the seat and the rubber members 26 and 27 will absorb the shock of the weight on the seat to provide additional resiliency. From the foregoing it is obvious that the bulkhead forms the back of the seat and that it is spaced above the bottom of the boat to provide space thereunder to accommodate the laterally spaced arms 10 and 11 and that the arms have the upper and lower edges diverging and curving upwardly and forwardly through the space for forming relatively rigid seat attaching portions at one side of the back and to which the seat member is secured. It is also obvious that the supports of resilient material which have their lower ends supported by the bottom of the boat and their upper ends engaging under the seat member cooperate with the arms in resiliently supporting the seat member.

It will be obvious from the foregoing that I have provided an improved resilient seat for boats or the like, easy to construct and efficient in operation.

What I claim and desire to secure by Letters Patent is:

1. In combination a boat, a seat having a back extending transversely of the boat and secured to the sides thereof to form a bulkhead for the boat and being spaced upwardly from the bottom of the boat, a pair of laterally spaced arms with upper and lower edge portions of said arms diverging and curving upwardly and forwardly through the space under the bulkhead for forming relatively thin resilient portions at one side of the bulkhead and relatively rigid seat attaching portions at the other sde of the bulkhead, means for securing the resilient portions of the arms on the bottom of the boat, a seat member extending across and attached to the seat attaching portions of the arms, and supports of resilient material, having lower ends supported by the bottom of the boat and upper ends engaging under said transverse seat member to cooperate with the arms in resiliently supporting the seat.

2. In combination with a boat having spaced longitudinal rails in the bottom thereof and a transverse bulkhead spaced upwardly from the rails, a seat for the boat including a pair of laterally spaced arms each having upper and lower edges diverging and curving upwardly and forwardly through the space under the bulkhead to provide relatively thin resilient portions on one side of the bulkhead and relatively rigid portions at the other side of the bulkhead, means for attaching the resilient portions of the arms to said rails, a seat member extending across and attached to said rigid portions of said arms with the bulkhead forming a back for said seat, supports of resilient material having lower ends fixed to the rails and having upper ends engaging under said seat member to cooperate with the arms in resiliently supporting the seat member.

3. In the combination as described in claim 1 wherein the arms are splayed relatively to each other for controlling lateral sway of the seat member.

4. In the combination described in claim 2, wherein the arms are splayed apart from the attaching points thereof with the rails for controlling lateral sway of the seat member.

5. In the combination as described in claim 2 wherein said supports are tubular members and have said ends fixed to the seat member and to said rails by dowels extending from the seat and rails into ends of the tubular members and spaced from each other to leave midportions of said members resilient under weight applied to the seat member.

6. In a seat the combination, with a pair of transversely spaced, stationary support members, of a pair of arms fixedly secured at one end to the respective support members, said arms being formed of a slightly flexible material and being reduced progressively in thickness from their other ends toward said one end thereof, said support members being horizontally disposed and the arms being inclined upwardly at a slight angle from the horizontal in a direction away from said one end thereof, the arms being formed at said other ends thereof with enlarged, upwardly extending forward portions; a seat board extending transversely between and fixedly secured at its opposite ends upon said forward portions of the arms; and resiliently compressible cushioning means connected between the underside of the seat board and the respective support members.

References Cited in the file of this patent
UNITED STATES PATENTS

| | | |
|---|---|---|
| 208,820 | Hubbell | Oct. 8, 1878 |
| 1,261,396 | Jackman | Apr. 2, 1918 |
| 1,663,112 | Caslow | Mar. 20, 1928 |
| 2,537,071 | Lukins | Jan. 9, 1951 |